United States Patent [19]

Hosoda et al.

[11] 3,716,391

[45] Feb. 13, 1973

[54] PROCESS FOR GRAFT POLYMERIZATION ONTO ORGANIC MACROMOLECULAR MATERIALS

[75] Inventors: Kirokuro Hosoda, Yokohama-shi; Yoshio Kadowaki, Tokyo; Eisuke Oda; Nobuo Hoshino, both of Yokohama-shi, all of Japan

[73] Assignee: The Furukawa Electric Company Limited, Chiyoda-ku, Tokyo, Japan

[22] Filed: Sept. 10, 1969

[21] Appl. No.: 856,643

[30] Foreign Application Priority Data

Sept. 14, 1968 Japan ................................43/66276
Oct. 19, 1968 Japan ................................43/76215

[52] U.S. Cl. ............117/47 A, 8/115.6, 117/106 R, 117/138.8 A, 117/138.8 E, 117/138.8 F, 117/138.8 N, 117/138.8 UA, 260/230, 260/844, 260/859 PV, 260/862, 260/877, 260/878 R, 260/884
[51] Int. Cl. .........................B44d 1/092, B44d 5/12
[58] Field of Search..117/118, 47 A, 138.8 E, 106 R, 117/138.8 A, 138.8 F, 138.8 N, 138.8 UA; 260/877, 844, 862, 878, 859 PV, 230, 884; 8/115.6

[56] References Cited

UNITED STATES PATENTS

| 3,298,969 | 1/1967 | D'Alelio | 260/877 |
| 3,487,037 | 12/1969 | Michel | 260/877 |
| 3,008,920 | 11/1961 | Urchick | 117/47 A |
| 3,211,808 | 10/1965 | Young et al. | 260/877 |
| 3,458,597 | 7/1969 | Jabloner | 260/877 |

*Primary Examiner*—Alfred L. Leavitt
*Assistant Examiner*—Janyce A. Bell
*Attorney*—Wenderoth, Lind & Ponack

[57] ABSTRACT

A process for graft polymerization of monomers onto organic macromolecular solid materials which comprises activating a macromolecular shaped article having a specific surface area of less than 3800 cm²/g with ozone under a condition of any point of the area defined by straight lines connecting $p_1$, $c_1$, $c_{10}$, $p_{10}$ in the attached FIG. 1, and further bringing said ozone activated material into contact with one or more radical polymerizable monomers in the presence of one or more members selected from the group consisting of trimethylamine, propylamine, ethylenediamine, piperidine, piperazine, morpholine, ethanolamine, hydroxyethyl ethylenediamine, pyridine, formamide and dimethyl formamide.

21 Claims, 1 Drawing Figure

PROCESS FOR GRAFT POLYMERIZATION ONTO ORGANIC MACROMOLECULAR MATERIALS

The present invention relates to a process for improving the properties of organic macromolecular solid materials by giving new desired properties to them with substantially no sacrifice of their original properties.

Although many organic macromolecular solid materials have their inherent properties and are used for various purposes, demands for some additional properties have arisen as the uses of such materials have expanded.

As a way of giving some new properties to a substrate of organic macromolecular solid materials, the common practice has been to blend an organic macromolecular material having such required properties with said substrate. However this process has some limitations which are caused by the fact that the blending should be done in the molten state of said substrate and is not therefore applicable to any shaped substrates and that the compatibility of any macromolecular material with another is generally not good enough to give a new desired property to a sufficient degree without sacrificing its original good properties, e.g., a good processability and an excellent clarity.

Recently the grafting process, which comprises graft polymerizing a desired monomer to a substrate of organic macromolecular materials, has been explored. The process has comparatively few limitations for various uses and is essentially suitable for giving new properties to said substrate. However, the methods of grafting hitherto known are technically difficult and neither economical nor efficient since the grafting reaction is activated by special ways using the ionizing radiation, the ultraviolet light, and the ultrasonic waves.

On the other hand ozone grafting method, which may be one of the simplest grafting methods, has been explored. However, it has been found that the oxidative deterioration and decomposition develop in said substrate during the activation of the substrate with ozone. Another difficulty in the ozone grafting process is that some homopolymerization accompanied the graft polymerization while the substrate activated with ozone is brought into contact with a monomer.

Those described above are practically important problems which are most disadvantageous for improvement of the properties of macromolecular materials; hence, at present the ozone grafting process is not used for practical purposes at all.

This invention is completed after an extensive study of the possible ways to give new desired properties to organic macromolecular solid materials with substantially no sacrifice of their original properties. The present invention shall be described in detail referring to the attached drawing, in which.

Figure 1:
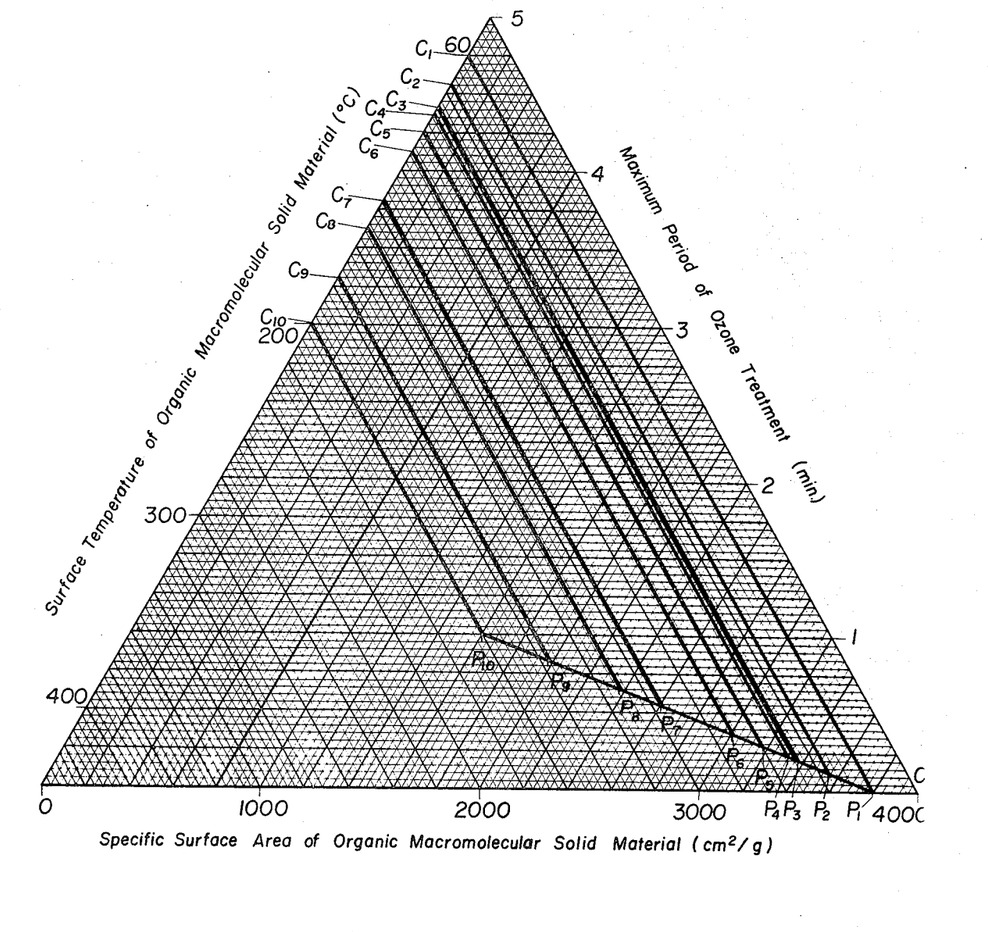
FIG. 1 is a graph specifying the condition of the ozone activation on triangular coordinates, under which organic macromolecular solid materials are brought into contact with ozone according to the present invention.

The objects of this invention are attained by bringing organic macromolecular solid materials having a specific surface area less than 3800 $cm^2/g$ into contact with ozone under a condition of any point of the area defined by the straight lines connecting $p_1$, $c_1$, $c_{10}$, $p_{10}$ in FIG. 1 to form active peroxides in the surface layer of said article while keeping the ozone from penetrating deep into the shaped article and by bringing the article activated with ozone into contact with radical polymerizable monomers and one or more members selected from the group consisting of trimethylamine, propylamine, ethylenediamine, piperidine, piperazine, morpholine, ethanolamine, hydroxyethyl ethylenediamine, pyridine, formamide and dimethyl formamide in any phase to polymerize.

The reason why in this invention the conditions of the ozone activation are confined is that in such case that the grafting activity is given to said solid materials by the way of ozone treatment, the formation of the grafting activity proceeds at the rate related to the specific surface area and the surface temperature of the solid materials. When the surface to be brought into contact with ozone is at elevated temperature, a sufficient amount of active peroxides form in the surface layer of the solid material very rapidly, but, the so-called ozone deterioration proceeds also rapidly. The deterioration proceeds in the direction from the surface to the inner layer of the substrate, and the growing rate of the deterioration is, at the initial stage of the ozone deterioration, governed also by the specific surface area and the surface temperature. Hence the appropriate conditions of the surface temperature and the period of the ozone activation are important in relation to the surface area of the substrate.

The inventors have found, after an extensive study of the conditions described above, that by bringing any of all organic macromolecular solid materials having a specific surface area of less than 3800 $cm^2/g$ into contact with ozone under a condition of any point of the area defined by straight lines connecting $p_1$, $c_1$, $c_{10}$, $p_{10}$ in FIG. 1, while by selecting a proper activation time, depending on the degree of grafting desired, desirably under the maximum period given in FIG. 1 in which appropriate conditions of the ozone activation are given on triangular coordinates relating to the specific surface area of said solid materials, their surface temperature, and the period of the ozone activation, a desired degree of the grafting activity is given at substantially no sacrifice of their original properties.

The reason why the surface temperature is defined in the range between the points $c_1$ and $c_{10}$ in FIG. 1, viz. 60°C and 200°C, is based on the new discovery that the formation of the grafting activity proceeds very rapidly as the result of occurrence of chain reaction like formation of peroxides under those conditions and that the rate of the ozone deterioration at the temperature of 60°C to 200°C is, although, higher than the rates at a temperature below 60°C, lowest as compared with the rate of the formation of the grafting activity. Hence under the conditions of the ozone activation for the short time indicated in FIG. 1, the ozone deterioration of the substrate of organic macromolecular materials is negligibly light, and is limited to the surface layer of the substrate; yet, a desired degree of the grafting activity is given to it.

Under 60°C it is impossible to avoid a serious deterioration which proceeds simultaneously with the peroxide formation if a sufficient amount of peroxides is to be obtained, since the deterioration develops in the organic macromolecular solid materials at approximately the same rate as the peroxide formation.

Above the surface temperature of 200°C, however, the temperature of ozone also exceeds 200°C and the danger of explosion increases; hence such dangerous conditions must be avoided as indicated in FIG. 1.

The conditions on the line between the points $p_1$ and $p_{10}$ in FIG. 1 have the meanings that it is very difficult to give a desired grafting activity onto the substrate of organic macromolecular materials while preventing a hard ozone deterioration when the specific surface area of the substrate is greater than $p_{10}$, viz. 1,600 cm²/g, since the higher the temperature is the faster penetrates ozone into the substrate.

The upper limits of the period of the ozone activation are such beyond which ozone diffuses deep into the substrate, thus causing a serious deterioration there, and the deterioration becomes remarkable since the rate of the formation of the grafting activity decreases with time.

According to the present invention, ozone may be present in the gas phase, e.g., ozone-containing gas as manufactured industrially from air or oxygen, which is suitable for homogeneously treating the substrate of organic macromolecular materials in complicated shape, or may be present in a liquid medium, which is suitable for giving a uniform temperature to the surface of the substrate, since the temperature affects the formation of the grafting activity considerably.

According to the present invention, the surface of the substrate is heated before being brought into contact with ozone, e.g., by preheating of the surface up to a desired temperature by a suitable heating means such as thermal conduction, thermal radiation, and high frequency induction heating. However, it is desirable to use ozone heated 60°C to 200°C as the surface reaches easily to the desired temperature without preheating. The latter process is preferable since the substrate thus obtained is free from undesirable thermal history.

There is no particular limit to the concentration of ozone. However, it is preferable to use ozone of above 0.1 percent by volume to give a sufficient grafting activity in a short time, and it is also preferable to use the ozone below 10 percent by volume to avoid any danger of explosion at highest temperature.

According to the present invention, in case said organic macromolecular material is low-density polyethylene, it is particularly preferable to bring it into contact with ozone at a temperature between 76° and 110°C because the rate of the diffusion of ozone in polyethylene is particularly high when the temperature is above the dispersion temperature of polyethylene, and because at a temperature above its melting point the surface condition of polyethylene substrate varies greatly by melting, which in some cases, causes the decrease of the diffusion.

In case said organic macromolecular material is high-density polyethylene, it is particularly preferable to bring it into contact with ozone at a temperature between 90° and 135°C for the same reasons as above.

In case said organic macromolecular material is polypropylene it is particularly preferable to bring it into contact with ozone at a temperature between 100°–175°C for the same reasons as above.

In case said organic macromolecular material is polyvinyl chloride it is particularly preferable to bring it into contact with ozone at a temperature between 87° to 150°C, because the rate of the diffusion of ozone in polyvinyl chloride is particularly high at a temperature above its glass transition temperature and because above 150°C there is a considerable deterioration of polyvinyl chloride by a chain reaction of hydrogen chloride elimination.

For the grafting by bringing a substrate of organic macromolecular materials into contact with radical polymerizable monomers in the present invention, conventional grafting methods can be used. However, it is preferable to use said monomers in the gaseous state so as to control the rate of grafting, although an extraordinary high grafting activity is formed concentratedly in the surface of the substrate at the activation condition of the present invention. However, in case a large amount of organic macromolecular solid materials is to be treated, it is preferable to effect the grafting using said monomers in the liquid state so as to control the surface temperature, thus preventing the building-up of polymerization heat therein.

During the grafting described above, the presence in the reaction medium of one or more members selected from the group consisting of trimethylamine, propylamine, ethylenediamine, piperidine, piperazine, morpholine, ethanolamine, hydroxyethyl ethylenediamine, pyridine, formamide and dimethyl formamide has such effects as increasing the rate of grafting onto the surface layer of said shaped materials activated with ozone under the conditions of the present invention and suppressing homopolymer formation.

The process comprising an impregnation process, in which a substrate of organic macromolecular material is into contact with one or more members selected from the group consisting of trimethylamine, propylamine, ethylenediamine, piperidine, piperazine, morpholine, ethanolamine, hydroxyethyl ethylenediamine, pyridine, formamide and dimethyl formamide, and a subsequent grafting process, in which the above treated substrate is brought into contact with radical polymerizable monomers, is particularly preferable, since the problem involved in separation of amines, amides, imines and imides and said monomers at the time of recovery thereof are eliminated.

After the grafting according to the present invention described above, desired properties such as dyeability, printability, adhesive property, antistatic property, and anti-slippery property, are given to the surface of any shaped articles made of organic macromolecular solid materials, and also excellent emulsion property, suspension property, and blending property are further given in case the solid materials have the shape such as powder, pellet, granule, flake, and chip.

Organic macromolecular solid materials for use in this patent are vinyl hydrocarbon polymers, vinyl polymers containing halogen atoms, vinyl polymers containing polar groups, and other synthetic addition polymers, polyamides, polyesters, polyimides, polysiloxanes, polysulfones, polyacetals, and other synthetic condensation polymers, and natural polymers, such as low-density polyethylene, high density polyethylene, polypropylene, polystyrene, polyvinyl chloride, polyvinylidene chloride, polytetrafluoroethylene, polyacrylonitrile, polyvinyl acetate, polymethyl methacrylate, polyvinyl carbazole, polyvinylformal, polybutadiene, polyisoprene, polychloroprene, ethyleneipropylene copolymer, ethylene-propylene-diene terpolymer, ethylene-acrylic acid copolymer, ethylene-acrylic ester copolymer, ethylene-vinyl acetate copolymer, vinyl chloride-vinylacetate copolymer, vinyl chloride-propylene copolymer, styrene-acrylonitrile copolymer, poly-ε-caprolactam, polyhexamethylene adipamide, polyhexamethylene sebacate, polyundecamide, polyethylene terephthalate, polyethylene isophthalate, polyoxymethylene, wood, paper, cotton, flaz, cellulose acetate, cellulose nitrate and other cellulose derivatives, natural rubber, wool, silk, starch, and a mixture of any two or more listed above.

The substrate of organic macromolecular materials may have the shape such as powder, pellet, granule, flake, chip, or any other given shape.

Radical polymerizable monomers for use in this invention to be brought into contact with organic macromolecular solid materials activated with ozone and to be polymerized as described above, are vinyl monomers, vinylidene monomers, and diene monomers, mixture of two or more of them, and also mixture of any one or more of them with any one or more of radical copolymerizable monomers which are not polymerizable alone. Radical polymerizable monomers are such as styrene, vinyl chloride, vinylidene chloride, acrylonitrile, methacrylonitrile, acrylic acid, methacrylic acid, methyl methacrylate, acrylamide, vinyl pyridine, methyl vinylpyridine, vinyl pyrollidone, ethylene, butadiene, isoprene, and radical copolymerizable monomers are such as itaconic acid, maleic acid anhydride, crotonic acid, vinyl-iso-butyl ether, vinyl-trimethoxy silane, α-methyl styrene, propylene, butylene, all of which are particularly preferable to add to organic macromolecular solid materials dyeability, printability, adhesive property, antistatic property, and anti-slippery property.

EXAMPLE 1

A 1,000 denier split yarn (specific surface area; 1,540 cm$^2$/g) was treated at 120°C for 0.5 minute with the gaseous ozone in oxygen, the concentration of which was 3.1 percent by volume. The yarn activated with ozone was placed in a glass flask together with an excess amount of ethyl acrylate monomer. The air in the flask was flushed out with nitrogen and then the flask and its content were heated at 120°C for three minutes. After the graft reaction the homopolymer of the monomer occluded in the yarn was extracted by immersing the yarn in acetone. The yarn was dried, weighed, and tested of various properties, viz. tensile strength, weather resistance (the period in which the tensile strength decreases to two thirds in a weatherometer), and dyeability with dispersion dyes. The results are shown in Table 1.

TABLE 1

| Ozone treatment | | | Graft reaction | | | Tensile strength (g./den.) | Weather resistance (hr.) | Dyeability |
|---|---|---|---|---|---|---|---|---|
| Concentration (vol. percent) | Temperature (° C.) | Time (min.) | Temperature (° C.) | Time (min.) | Weight increase (percent) | | | |
| 3.1 | 120 | 0.5 | 120 | 3 | 6.4 | 3.36 | 3,100 | Deep. |

In Example 1 and in the following References the dyeability is evaluated in the order; deep>medium>pale>very pale>stained>none.

It is obvious by comparing the results in Table 1 with the results in Table 2 in the following Reference 1, that the process of this invention is much better in improving the dyeability and the weather resistance and in retaining the tensile strength.

REFERENCE 1

The same high density polyethylene split yarns as in Example 1 were given an ozone treatment as follows: (2) under the same condition as in Example 1, and (3) and (4) at 26°C for 1 hour.

Then only the yarn (4) was grafted with ethyl acrylate under the same condition as in Example 1.

The grafted yarns thus obtained were tested of those properties in Example 1. The results are shown in Table 2.

TABLE 2

| Ozone treatment | | | Graft reaction | | | Tensile strength (g./den.) | Weather resistance (hr.) | Dyeability |
|---|---|---|---|---|---|---|---|---|
| Concentration (vol. percent) | Temperature (° C.) | Time (min.) | Temperature (° C.) | Time (min.) | Weight increase (percent) | | | |
| 1 | | | | None | | 3.35 | 3,000 | None. |
| 2 | 3.1 | 120 | 0.5 | None | | 3.30 | 2,900 | Stained. |
| 3 | 3.1 | 26 | 60 | None | | 3.14 | 2,400 | Do. |
| 4 | 3.1 | 26 | 60 | 120 | 3 | 5.9 | 3.15 | 2,500 | Pale |

NOTE: 1=control.

EXAMPLE 2

A high density polyethylene sheet of 1 mm in thickness (specific surface area; 25 cm$^2$/g) was treated at 125°C for one minute with the gaseous ozone in oxygen, the concentration of which was 1.2 percent by volume. The sheet activated with ozone was placed in a glass flask together with an excess amount of methyl methacrylate monomer. The air in the flask was flushed out with nitrogen and then the flask and its content were heated at 80°C for 60 minutes.

After the graft reaction the homopolymer of the monomer occluded in the sheet was extracted by immersing the sheet in acetone. The sheet was dried, weighed, and tested of an adhesive property as follows; a cellophane adhesive tape was compressed to the grafted surface of the sheet or to the surface which appeared by removing about 10 μ-thick grafted surface layer with a sand paper, and then the peel strength was measured by peeling the tape to the direction 180°. The results are shown in Table 3.

TABLE 3

| Ozone treatment | | | Graft reaction | | | Peel strength (kg./cm.) | |
|---|---|---|---|---|---|---|---|
| Concentration (vol. percent) | Temperature (°/C.) | Time (min.) | Temperature (°/C.) | Time (min.) | Weight increase (percent) | Grafted surface | Inner region |
| 1.2 | 125 | 1 | 80 | 60 | 6.4 | 1.52 | 0.54 |

It is obvious by comparing the results in Table 3 with the results in Table 4 in the following Reference 2, that the process of this invention is much better in improving the adhesive property of the surface, and keeps the inner region of the sheet from the grafting effect. This means that graft polymerization proceeds in the surface layer of the sheet under the condition of this invention, as the result that the ozone activation is limited only in that layer.

REFERENCE 2

The same high density polyethylene sheets as in Example 2 were given an ozone treatment as follows: (2) at 26°C for 2 hours and (3) at 60°C for 30 minutes.

Then methyl methacrylate was grafted onto the sheets (2) (3) under the same condition as in Example 2.

The grafted sheets thus obtained were weighed and tested of the adhesive property. The results are shown in Table 4.

TABLE 4

| | Ozone treatment | | | Graft reaction | | | Peel strength (kg./cm.) | |
|---|---|---|---|---|---|---|---|---|
| | Concentration (vol. percent) | Temperature (° C.) | Time (min.) | Temperature (° C.) | Time (min.) | Weight increase (percent) | Grafted surface | Inner region |
| 1 | None | | | None | | | 0.47 | 0.48 |
| 2 | 1.2 | 26 | 120 | 80 | 60 | 8.2 | 1.03 | 0.96 |
| 3 | 1.2 | 60 | 30 | 80 | 60 | 7.4 | 1.10 | 0.85 |

NOTE: 1=control.

EXAMPLE 3

A yarn of 6 denier polypropylene filaments (specific surface area; 1480 cm²/g) was treated at 130°C for various length of time with the gaseous ozone in oxygen, the concentration of which was 1.2 percent by volume. The yarn activated with ozone was placed in a glass flask and a gaseous mixture of acrylic acid, the partial pressure of which was 540 mmHg, and nitrogen was charged into it, and the flask and its contents were maintained at 180°C for 10 minutes.

After the reaction above, the homopolymer of acrylic acid occluded in the yarn was extracted by immersing it in hot water. The yarn was dried, weighed, and tested of tensile strength and dyeability with basic dyes. The results are shown in Table 5.

It is obvious that by increasing the time of ozone treatment, the weight of the yarn increased, thus the graft polymerization proceeded with time, while the dyeability was much improved, however, at the longest ozone treatment, viz. fifteen minutes, which was made by way of an experiment for reference, the yarn was considerably deteriorated and its tensile strength was apparently decreased.

EXAMPLE 4

A low density polyethylene film of about 0.05 mm in thickness (specific surface area; 440 cm²/g) was treated at 100°C for 1 minute with the gaseous ozone in oxygen, the concentration of which was 0.9 percent by volume. The film activated with ozone was placed in a glass flask together with an excess amount of styrene-monoethanol amine solution. The air in the flask was flushed out with nitrogen and then the flask and its content were heated at 100°C for 5 minutes (Experiment 1).

The same polyethylene film as used above was treated at 26°C for 1 hour with the same ozone as in Experiment 1. The graft polymerization was effected also by the same procedure as in Experiment 1 at 100°C for 15 minutes, except that pure styrene was used instead of the solution with monoethanol amine (Experiment 2).

After these experiments, the homopolymer of the monomer occluded in the films was extracted by immersing them in benzene. The films were dried and weighed. The results are shown in Table 6.

Experiment 1 is a process of this invention and Experiment 2 is for reference. From Table 6 it is obvious that the process of 1 is much superior to the process of 2 in suppressing the homopolymerization.

TABLE 5

| | Ozone treatment | | | Graft reaction | | | Tensile strength (g./den.) | Dyeability |
|---|---|---|---|---|---|---|---|---|
| | Concentration (vol. percent) | Temperature (° C.) | Time (min.) | Temperature (° C.) | Time (min.) | Weight increase (percent) | | |
| 1 | None | | | None | | | 4.61 | None. |
| 2 | 1.2 | 130 | 0.05 | 130 | 10 | 0.05 | 4.59 | Very pale. |
| 3 | 1.2 | 130 | 0.17 | 130 | 10 | 1.5 | 4.60 | Medium. |
| 4 | 1.2 | 130 | 2 | 130 | 10 | 11.9 | 4.71 | Deep. |
| 5 | 1.2 | 130 | 15 | 130 | 10 | 32.5 | 3.25 | Do. |

NOTE: 1=control; 2, 3 and 4=present invention; 5=for reference.

TABLE 6

| | Ozone treatment | | | Graft reaction | | | | |
|---|---|---|---|---|---|---|---|---|
| | Concentration (vol. percent) | Temperature (° C.) | Time (min.) | Temperature (° C.) | Time (min.) | Concentration of mono ethanolamine (vol. percent) | Weight increase by graft polymerization (percent) | Weight increase by homopolymerization (percent) |
| 1 | 0.9 | 100 | 1 | 100 | 5 | 3.2 | 7.5 | 0.7 |
| 2 | 0.9 | 26 | 60 | 100 | 15 | 0 | 10.1 | 6.8 |

NOTE: 1=present invention; 2=for reference.

EXAMPLE 5

The same polyethylene films as in Example 4 were treated at 103°C for 0.3 minute with the gaseous ozone in oxygen, the concentration of which was 1.2 percent by volume.

One of the films activated with ozone was placed in a glass flask together with an excess amount of acrylic acid-dimethyl formamide solution, the concentration of the amide being 5 percent by volume. The air in the flask was flushed out with nitrogen and then the flask and its content were heated at 100°C for 1 minute. (Experiment 1)

Acrylic acid was grafted onto another film at 103°C for 10 minutes by the same procedure as in Experiment 1, except that pure acrylic acid was used instead of the solution with dimethyl formamide (Experiment 2).

After these experiments, the homopolymer of the monomer occluded in the film was extracted by immersing them in hot water. The films were dried and weighed. The results are shown in Table 7.

TABLE 7

| | Ozone treatment | | | Graft reaction | | | | |
|---|---|---|---|---|---|---|---|---|
| | Concentration (vol. percent) | Temperature (° C.) | Time (min.) | Temperature (° C.) | Time (min.) | Concentration of dimethyl formamide (vol. percent) | Weight increase by graft polymerization (percent) | Weight increase by homopolymerization (percent) |
| 1 | 1.2 | 103 | 0.3 | 100 | 1 | 5 | 10.6 | 1.2 |
| 2 | 1.2 | 103 | 0.3 | 100 | 10 | 0 | 8.2 | 2.9 |

NOTE: 1=present invention; 2=for reference.

Experiment 1 is a process of this invention and Experiment 2 is for a reference. From Table 7 it is obvious that the process of 1 is much superior to the process of 2 in suppressing the homopolymerization and in enhancing the graft polymerization.

EXAMPLE 6

A high density polyethylene film of about 0.2 mm in thickness (specific surface area; 108 cm²/g) was treated at 120°C for 2 minutes with the gaseous ozone in oxygen, the concentration of which was 1.2 percent by volume. The film activated with ozone was placed in a glass flask and butadiene gas was charged into it. The flask and its contents were heated at 110°C for 20 minutes.

After the reaction above, the homopolymer of butadiene occluded in the film was extracted by immersing it in cyclohexane. The film was dried, weighed, and tested of friction property by the method of ASTM D1894–63. The results are shown in Table 8.

TABLE 8

| | Ozone treatment | | | Graft reaction | | | Tensile strength (kg./cm.²) | Friction coefficient | |
|---|---|---|---|---|---|---|---|---|---|
| | Concentration (vol. percent) | Temperature (° C.) | Time (min.) | Temperature (° C.) | Time (min.) | Weight increase (percent) | | Static | Dynamic |
| 1 | | | | None | None | | 310 | 0.25 | 0.18 |
| 2 | 1.2 | 120 | 2 | 110 | 20 | 14.9 | 310 | 0.87 | 0.49 |
| 3 | 1.2 | 26 | 120 | 110 | 20 | 15.1 | 281 | 0.62 | 0.39 |

NOTE: 1=control; 2=present invention; 3=for reference.

It is obvious from Table 8 that the grafted film by the process of this invention (Experiment 2) has a large friction coefficient, which means that anti-slippery property is given to the film.

EXAMPLE 7

The powder of low density polyethylene of 60 μ in average diameter (specific surface area; 110 cm²/g) was immersed and dispersed in butyl acetate in a glass flask, and then treated with ozone at 100°C for 0.5 minutes by bubbling the dispersed system with a gaseous mixture of ozone and oxygen, the concentration of ozone being 0.9 percent by volume. The powder thus activated with ozone was immersed in an excess amount of ethylacrylate in a glass flask. Then, after the air in the flask was flushed out with nitrogen, the flask and its content were heated at 100°C for 10 minutes.

After the reaction above, the homopolymer of ethyl acrylate occluded in the powder was extracted by immersing it in acetone. The powder was dried, weighed, and after being compressed into 0.1mm thick film, tested of tensile strength and dyeability to dispersion dyes. The results are shown in Table 9.

It is obvious from Table 9 that polyethylene grafted by the process of this invention gains dyeability with no sacrifice of its tensile strength.

TABLE 9

| | Ozone treatment | | | Graft reaction | | | | |
|---|---|---|---|---|---|---|---|---|
| | Concentration (vol. percent) | Temperature (°C.) | Time (min.) | Temperature (°C.) | Time (min.) | Weight increase (percent) | Tensile strength (kg./cm.²) | Dyeability |
| 1 | | | None | | None | | 197 | None. |
| 2 | 0.9 | 100 | 0.5 | 100 | 10 | 14.7 | 199 | Deep. |
| 3 | 0.9 | 26 | 60 | 100 | 10 | 13.9 | 178 | Do. |

NOTE: 1=control; 2=present invention; 3=for reference.

EXAMPLE 8

The powder of high density polyethylene of 40μ in average diameter (specific surface area; 156 cm²/g) was treated with ozone by the same way as in Example 7 at 120°C for 1 minute. The powder thus treated with ozone was immersed in an excess amount of methyl methacrylate in a glass flask. Then after the air in the flask was flushed out with nitrogen, the flask and its content were heated at 120°C for 30 minutes.

After the above reaction, the homopolymer of the monomer occluded in the powder was extracted by immersing it in acetone. The powder was dried, weighed, and, after being compressed into 1 mm-thick film, tested of an adhesive property by the same way in Example 2. The results are shown in Table 10.

TABLE 10

| | Ozone treatment | | | Graft reaction | | | | |
|---|---|---|---|---|---|---|---|---|
| | Concentration (vol. percent) | Temperature (°C.) | Time (min.) | Temperature (°C.) | Time (min.) | Weight increase (percent) | Tensile strength (kg./cm.²) | Peel strength (kg./cm.) |
| 1 | | | None | | None | | 310 | 0.51 |
| 2 | 0.9 | 120 | 1 | 120 | 30 | 28.3 | 310 | 1.79 |
| 3 | 0.9 | 26 | 60 | 120 | 30 | 25.9 | 292 | 1.63 |

NOTE: 1=control; 2=present invention; 3=for reference.

It is obvious from Table 10 that the adhesive property of polyethylene grafted by the process of this invention is much better than that of original polyethylene.

EXAMPLE 9

The same polyethylene powder used in Example 7 was treated at 100°C for 3 minutes with ozone in a glass tube with a rectifying plate of sintered glass at its bottom, under a fluidized condition in the gaseous mixture of ozone and oxygen. The concentration of ozone in the mixture was 0.5 percent by volume. After the treatment, the gaseous mixture was flushed out with nitrogen, and then a gaseous mixture of vinylidene chloride and nitrogen was charged into it. The tube and its content were heated at 100°C for 20 minutes.

After the reaction above, the homopolymer of the monomer occluded in the powder was extracted by immersing it in cyclohexanone. The powder was dried, weighed, and after being compressed into a 0.1 mm thick-film, tested of the water permeability of moisture at 40°C and at 90 percent of the relative humidity by the cup method. The results are shown in Table 11.

TABLE 11

| | Ozone treatment | | | Graft reaction | | | | Water permeation (g./m.²/ mm./24 h.) |
|---|---|---|---|---|---|---|---|---|
| | Concentration (vol. percent) | Temperature (°C.) | Time (min.) | Temperature (°C.) | Time (min.) | Weight increase (percent) | Tensile strength (kg./cm.²) | |
| 1 | | | None | | None | | 197 | 15 |
| 2 | 0.5 | 100 | 3 | 100 | 20 | 37.4 | 197 | 2.8 |
| 3 | 0.5 | 26 | 90 | 100 | 20 | 36.7 | 173 | 3.1 |

NOTE: 1=control; 2=present invention; 3=for reference.

It is obvious from Table 11 that the resistance of polyethylene film against water vapor permeation is improved very much by grafting under the condition of this invention.

EXAMPLE 10

Polypropylene tapes uniaxially drawn 800 percent, in a thickness of 0.01 mm (specific surface area; 2230 cm²/g) were treated at 150°C for 0.3 minute with the gaseous ozone in oxygen, the concentration of which was 1.2 percent by volume. Each tape thus activated were fixed in a flask under some tension and grafted by the same way as in Example 3 under the following condition; at 150°C for 10 minutes using a gaseous mixture of acrylic acid (partial pressure; 510 mmHg) and nitrogen (Experiment 1) and at 150°C for 2 minutes using the mixture of acrylic acid (partial pressure; 510 mmHg), the vapor of dimethyl formamide (partial pressure; 56 mmHg) and nitrogen (Experiment 2).

After the reaction above, the homopolymer of the monomer occluded in the tapes was extracted by immersing it in hot water. The tapes were dried and weighed. The results are shown in Table 12.

It is obvious from Table 12 that dimethyl formamide present in the reaction system has a remarkable effect on enhancing the grafting and on suppressing the homopolymerization.

TABLE 12

| | Ozone treatment | | | Graft reaction | | | | |
|---|---|---|---|---|---|---|---|---|
| | Concentration (vol. percent) | Temperature (°C.) | Time (min.) | Temperature (°C.) | Time (min.) | Partial pressure of dimethyl formamide (mm. Hg) | Weight increase by graft polymerization (percent) | Weight increase by homopolymerization (percent) |
| 1 | 1.2 | 150 | 0.3 | 150 | 10 | None | 10.3 | 4.5 |
| 2 | 1.2 | 150 | 0.3 | 150 | 2 | 56 | 14.6 | 0.7 |

NOTE: 1=for reference; 2=present invention.

EXAMPLE 11

A biaxially stretched film of polyethylene terephthalate of 0.05 mm in thickness (specific surface area; 368 cm²/g) was treated at 110°C for 1 minute with the gaseous ozone in air, the concentration of which was 0.2 percent by volume. The film activated with ozone was placed in a glass flask together with an excess amount of styrene monomer. The air in the flask was flushed out with nitrogen and then the flask and its content were heated at 90°C for 1 hour. After the above reaction, the homopolymer of the monomer occluded in the film was extracted by immersing the film in benzene. The film was dried, weighed, and tested of adhesive property with rubber adhesives. The results are shown in Table 13.

The adhesive strength of the surface of the film grafted by the procedure above, with rubber adhesives was 2.8 times greater than that of the original film, while the adhesive strength of the surface which appeared by removing the about 10 μ thick grafted surface layer with a sand paper was nearly the same as that of the original film. This means that the process of this invention is suitable for giving an improved adhesive property only to the surface layer, because the ozone activation is limited only to that layer.

EXAMPLE 13

The same polyethylene terephthalate film activated with ozone by the same procedure in Example 12 was placed in a glass flask and nitrogen gas containing the 100°C saturated vapor of acrylic acid was charged into

TABLE 13

| | Ozone treatment | | | Graft reaction | | | | |
|---|---|---|---|---|---|---|---|---|
| | Concentration (vol. percent) | Temperature (°C.) | Time (min.) | Temperature (°C.) | Time (min.) | Weight increase (percent) | Tensile strength (kg./cm.²) | Relative adhesive strength |
| 1 | | | None | | None | | 2,100 | 1 |
| 2 | 0.2 | 26 | 90 | 90 | 60 | 0.52 | 1,940 | 1.2 |
| 3 | 0.2 | 110 | 1 | 90 | 60 | 0.48 | 2,100 | 1.5 |

NOTE: 1=control; 2=for reference; 3=present invention.

EXAMPLE 12

The same polyethylene terephthalate film as in Example 11 was treated at 100°C for 0.5 minutes with the gaseous ozone in oxygen, the concentration of which was 0.9 percent by volume. The film activated with ozone was placed in a glass flask and nitrogen gas containing the 100°C saturated vapor of styrene and formamide was charged into it, then the flask and its content were heated at 100°C for 30 minutes.

After the reaction above, the homopolymer of the monomer occluded in the film was extracted by immersing it in benzene. The film was dried, and weighed. The results are shown in Table 14.

it. The flask and its contents were heated at 100°C for 3 minutes.

After the reaction above, the homopolymer of the monomer occluded in the film was extracted by immersing it in hot water. The film was dried, and weighed. The results are shown in Table 15.

TABLE 15

| | Ozone treatment | | | Graft reaction | | | | |
|---|---|---|---|---|---|---|---|---|
| | Concentration (vol. percent) | Temperature (°C.) | Time (min.) | Temperature (°C.) | Time (min.) | Weight increase (percent) | Tensile strength (kg./cm.²) | Dyeability |
| 1 | | | None | | None | | 2,100 | Stained. |
| 2 | 0.9 | 26 | 90 | 100 | 3 | 1.7 | 1,950 | Medium. |
| 3 | 0.9 | 100 | 0.5 | 100 | 3 | 1.9 | 2,100 | Deep. |

NOTE: 1=control; 2=for reference; 3=present invention.

Thus obtained film was deeply and homogeneously dyeable with basic dyes and dispersion dyes.

EXAMPLE 14

The powder of polyvinyl chloride of 50μ in average diameter (specific surface area; 86 cm²/g) was treated at 100°C for 0.3 minute with ozone 0.9 percent by

TABLE 14

| | Ozone treatment | | | Graft reaction | | | | |
|---|---|---|---|---|---|---|---|---|
| | Concentration (vol. percent) | Temperature (°C.) | Time (min.) | Temperature (°C.) | Time (min.) | Weight increase (percent) | Tensile strength (kg./cm.²) | Relative adhesive strength |
| 1 | | | None | | None | | 2,100 | 1 |
| 2 | 0.9 | 26 | 90 | 100 | 30 | 2.4 | 1,930 | 2.1 |
| 3 | 0.9 | 100 | 0.5 | 100 | 30 | 2.6 | 2,100 | 2.8 |

NOTE: 1=control; 2=for reference; 3=present invention.

volume under the same fluidized condition as in Example 9. The powder activated with ozone was immersed and dispersed in solution comprising; five parts of vinyltoluene, one part of divinylbenzene and four parts of ethanol in a glass flask, then grafted at 60°C for 1 hour after the air in the flask was flushed out with nitrogen.

After the reaction above, the powder was washed in ethanol, and then a small amount of plastsizer was added. By compression molding, clear sheets were obtained from the grafted powder impregnated with plastisizer, highly stable against heat distortion, substantially above 170°C. By the elemental analysis of chlorine, it was found that the above sheets contained 5.2 percent by volume of the copolymer of styrene and divinylbenzene grafted onto polyvinyl chloride. The results are shown in Table 16.

TABLE 16

| | Ozone treatment | | | Graft reaction | | | Heat distortion temperature under load (kg./mm.²)(°C.) |
|---|---|---|---|---|---|---|---|
| | Concentration (vol. percent) | Temperature (° C.) | Time (min.) | Temperature (° C.) | Time (min.) | Weight increase (percent) | |
| 1 | | | | None | | None | 135 |
| 2 | 0.9 | 26 | 60 | 60 | 90 | 5.2 | 145 |
| 3 | 0.9 | 100 | 0.3 | 60 | 60 | 5.2 | >170 |

NOTE: 1=control; 2=for reference; 3=present invention.

EXAMPLE 15

The same polyvinyl chloride powder activated with ozone by the same procedure in Example 14 was grafted by the same way as in Example 14 under the following conditions; (1) at 50°C for 1 hour using methyl methacrylate monomer of 30 percent concentration in methanol. (Experiment 1), (2) the same conditions as in Experiment 1, except that the powder was impregnated, before the grafting process, with pyridine by immersing them in 10 percent pyridine solution in ethanol (Experiment 2). The powder used in Experiment 2 contains 0.4 percent by weight of pyridine after the impregnation treatment at 50°C for 1 hour, and after drying in vacuo at 0°C.

After the reaction the powder was washed in ethanol, dried in vacuo, and weighed. The results are shown in Table 17.

TABLE 17

| | Ozone treatment | | | Graft reaction | | | |
|---|---|---|---|---|---|---|---|
| | Concentration (vol. percent) | Temperature (° C.) | Time (min.) | Temperature (° C.) | Time (min.) | Impregnation of pyridine | Weight increase (percent) |
| 1 | 0.9 | 100 | 0.3 | 50 | 60 | No | 4.4 |
| 2 | 0.9 | 100 | 0.3 | 50 | 60 | Yes | 13.1 |

NOTE: 1=for reference; 2=present invention.

It is obvious from Table 17 that pyridine present in the reaction system has a remarkable effect on enhancing the grafting.

What we claim is:

1. A process for graft polymerization of monomers onto organic macromolecular solid materials, which consists essentially of activating a macromolecular solid material having a specific surface area of less than 3800 cm²/g with ozone under a condition of any point of the area defined by the straight lines connecting $p_1$, $c_1$, $c_{10}$, $p_{10}$ in FIG. 1 to produce ozone activated solid materials, and further bringing said ozone activated solid materials into contact with a material consisting essentially of one or more radical polymerizable monomers in the presence of one or more members selected from the group consisting of trimethylamine, propylamine, ethylenediamine, piperidine, piperazine, morpholine, ethanolamine, hydroxy-ethyl ethylenediamine, pyridine, formamide and dimethyl formamide.

2. A process as claimed in claim 1 wherein the ozone is present in the gas phase.

3. A process as claimed in claim 1 wherein the ozone is present in a liquid medium.

4. A process as claimed in claim 1 wherein the ozone is preheated to a temperature of between 60° and 200°C.

5. A process as claimed in claim 1 wherein the concentration of the ozone is 0.1 to 10 percent by volume.

6. A process as claimed in claim 1 wherein the organic macromolecular shaped article is brought into contact with the monomer and simultaneously with one or more members selected from the group consisting of trimethylamine, propylamine, ethylenediamine, piperidine, piperazine, morpholine, ethanolamine, hydroxy-ethyl ethylenediamine, pyridine, formamide and dimethyl formamide.

7. A process as claimed in claim 1 wherein the radical polymerizable monomer and one or more members selected from the group consisting of trimethylamine, propylamine, ethylenediamine, piperidine, piperazine, morpholine, ethanolamine, hydroxy-ethyl ethylenediamine, pyridine, formamide and dimethyl formamide are in the gaseous state.

8. A process as claimed in claim 1 wherein the radical polymerizable monomer and one or more members selected from the group consisting of trimethylamine, propylamine, ethylenediamine, piperidine, piperazine, morpholine, ethanolamine, hydroxy-ethyl ethylenediamine, pyridine, formamide and dimethyl formamide are in the liquid state.

9. A process as claimed in claim 1 wherein any one or more members selected from the group consisting of trimethylamine, propylamine, ethylenediamine, piperidine, piperazine, morpholine, ethanolamine, hydroxy-ethyl ethylenediamine, pyridine, formamide and dimethyl formamide are brought into contact with the organic macromolecular solid material prior to contact with said monomer.

10. A process as claimed in claim 1 wherein the organic macromolecular solid material is preheated so as to heat the surface of the article to a temperature of between 60° and 200°C.

11. A process as claimed in claim 1 wherein the radical polymerizable monomers are one or more members selected from the group consisting of styrene, vinyl chloride, vinylidene chloride, acrylonitrile, methacrylonitrile, acrylic acid, methacrylic acid, methyl methacrylate, acrylamide, vinylpyridine, methyl vinylpyridine, vinylpyrollidone, ethylene, butadiene and isoprene.

12. A process as claimed in claim 1 wherein the organic macromolecular solid material is made of low density polyethylene and said low density polyethylene is brought into contact with ozone under a condition selected from any point within the area defined by the straight lines connecting $p_2, c_2, c_6, p_6$ in FIG. 1.

13. A process as claimed in claim 1 wherein the organic macromolecular solid material is made of high density polyethylene and said high density polyethylene is brought into contact with ozone under a condition selected from any point within the area defined by the straight lines connecting $p_4, c_4, c_7, p_7$ in FIG. 1.

14. A process as claimed in claim 1 wherein the organic macromolecular solid material is made of polypropylene and said polypropylene is brought into contact with ozone under a condition selected from any point within the area defined by the straight lines connecting $p_5, c_5, c_9, p_9$ in FIG. 1.

15. A process as claimed in claim 1 wherein the organic macromolecular solid material is made of polyvinyl chloride and said polyvinyl chloride is brought into contact with ozone under a condition selected from any point within the area defined by the straight lines connecting $p_3, c_3, c_8, p_8$ in FIG. 1.

16. A process as claimed in claim 1 wherein the organic macromolecular solid material is made of a synthetic addition polymer.

17. A process as claimed in claim 16 wherein the synthetic addition polymer is selected from the group consisting of polyethylene, polypropylene, polyvinyl chloride and polytetrafluoroethylene.

18. A process as claimed in claim 1 wherein the organic macromolecular solid material is made of a synthetic condensation polymer.

19. A process as claimed in claim 18 wherein the condensation polymer is selected from the group consisting of polyethylene terephthalate, polyhexamethylene adipamide and poly-ε-caprolactam.

20. A process as claimed in claim 1 wherein the radical polymerizable monomers are mixed with radical copolymerizable monomers.

21. A process as claimed in claim 20 wherein the radical copolymerizable monomers to be mixed with radical polymerizable monomers are selected from the group consisting of itaconic acid, maleic acid anhydride, crotonic acid, vinyl-iso-butyl ether, vinyl-trimethoxy silane, α-methyl styrene, propylene and butylene.

* * * * *